United States Patent [19]
Balquet et al.

[11] 3,875,885
[45] Apr. 8, 1975

[54] GAS INJECTION PROPULSION SYSTEM FOR MARINE VEHICLES

[75] Inventors: Robert Jean Balquet, Paris; Michel Courouble, Le Havre, both of France

[73] Assignee: Etat Francais, Paris, France

[22] Filed: Sept. 12, 1973

[21] Appl. No.: 396,362

[30] Foreign Application Priority Data
Sept. 12, 1972 France .................. 72.32191

[52] U.S. Cl. .................. 114/67 A; 115/15
[51] Int. Cl. .................. B636 1/38
[58] Field of Search .......... 114/67 R, 67 A, 66.5 R, 114/66.5 H, 66.5 S, 56; 115/11, 15; 180/116, 117, 126

[56] References Cited
UNITED STATES PATENTS

| | | | |
|---|---|---|---|
| 986,766 | 3/1911 | Shroeder | 115/15 |
| 3,117,545 | 1/1964 | Warner | 114/67 A |
| 3,125,977 | 3/1964 | Kurihara | 114/67 A |
| 3,335,687 | 8/1967 | Von Schertel | 114/66.5 H |
| 3,455,267 | 7/1969 | Tucker | 114/67 A |
| 3,628,488 | 12/1971 | Gibson | 114/67 A |

Primary Examiner—Trygve M. Blix
Assistant Examiner—Charles E. Frankfort
Attorney, Agent, or Firm—Larson, Taylor & Hinds

[57] ABSTRACT

An air injection propulsion system for marine vessels is provided which includes a primary gas injector for creating an axial gas flow beneath the vessel's hull, a primary aerator located beneath the vessel's hull for generating an aerated flow of water and a secondary aerator, for further refining the aerated flow, which includes a deflecting surface to provide the main propulsive effect. The primary aerator comprises a contoured surface positioned transversely to the gas flow, which, in one embodiment, has located therein a series of slots with their axes parallel to the gas flow. Axial and transverse aeration of the water flow adjacent the gas flow are generated simultaneously by the primary aerator from the same axial gas flow. The primary aerator further comprises a deflecting foil spaced from and positioned opposite to the contoured surface which complements both types of aeration generated by the contoured surface. The secondary aerator comprises one or more gas injectors spaced transversely across the inclined rear surface of the vessel's hull and one or more contoured surface diluting foils located rearward of the primary aerator and positioned transversely across the aerated flow from the primary aerator.

9 Claims, 12 Drawing Figures

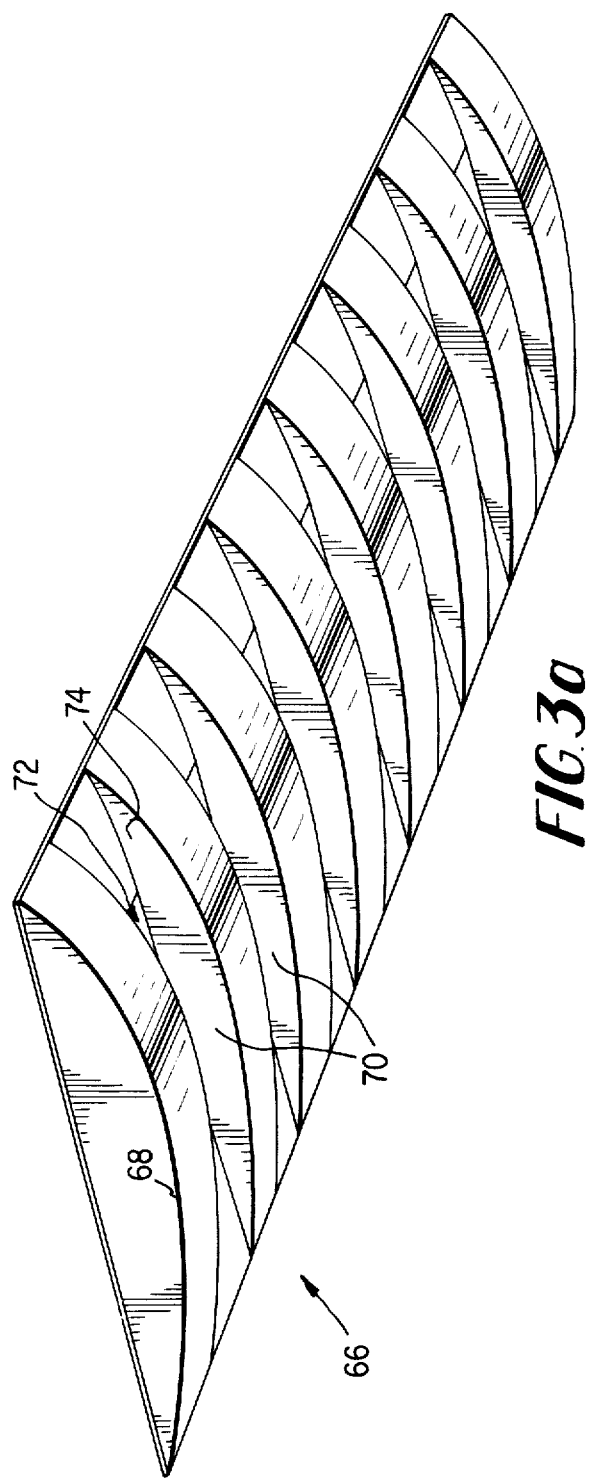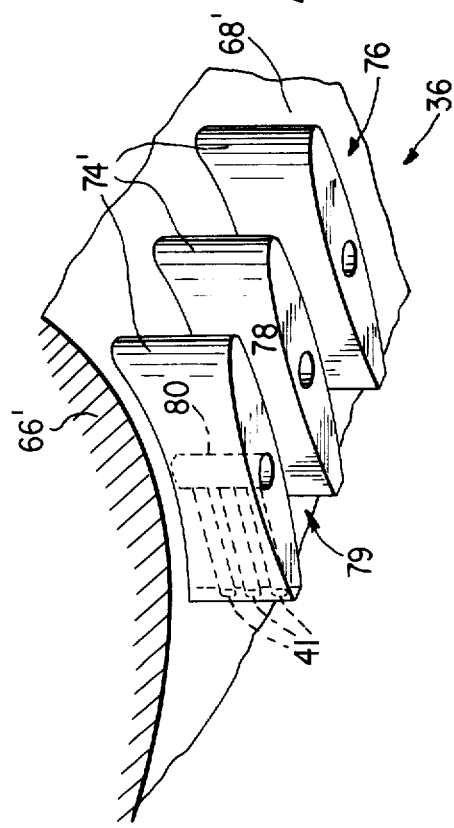

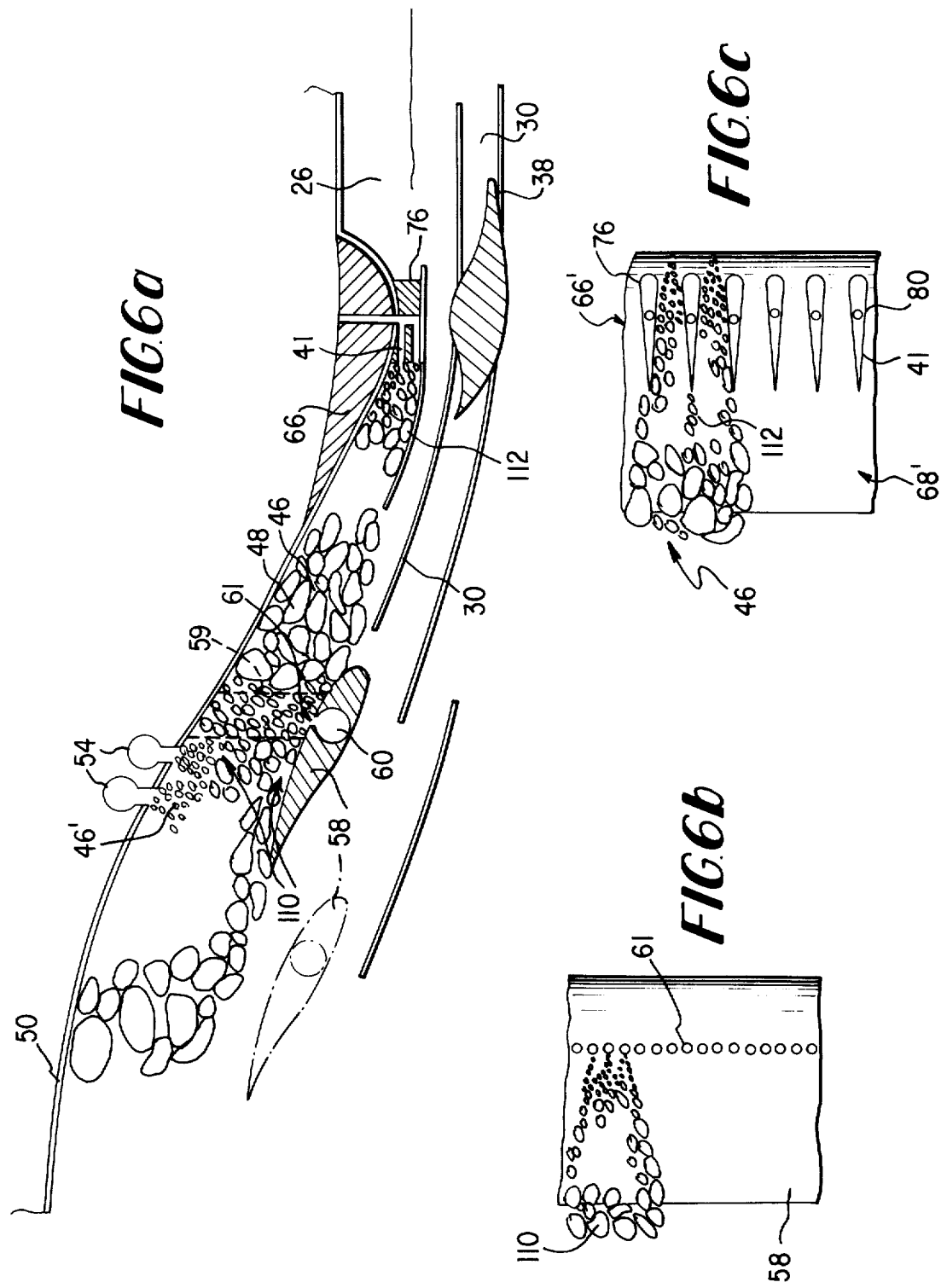

3,875,885

GAS INJECTION PROPULSION SYSTEM FOR MARINE VEHICLES

BACKGROUND OF THE INVENTION

1. Field of the Invention

This invention relates generally to marine propulsion systems and, more particularly, to air injection marine propulsion systems.

2. Description of the Prior Art

Various air injection propulsion systems for marine vessels are known in the prior art. In general, such systems operate by injecting air into the water beneath the hull of the vessel, thus creating a flow of aerated water. This aerated flow is subjected to hydrostatic forces which result in an expansion of the flow. The increase in the volume of the air injected into the water is accompanied by an increase in the mass of water drawn along by the aerated water flow and by an increase in the speed of the flow. These changes in the volume and speed of the aerated flow produce a reactive force which is exerted against an inclined surface positioned so as to deflect the aerated flow thereby resulting in propulsion of the vehicle. Generally speaking, while these simple devices have advantages, they suffer the important disadvantage of producing an aerated flow with low propulsive efficiency.

SUMMARY OF THE INVENTION

The disadvantages of the prior art are substantially overcome by the embodiments of the present invention wherein a gas injection propulsion system is provided which includes a gas generator for producing a homogeneous axial flow of gas beneath the vessel's hull and a primary aerator located beneath the vessel's hull, the depth thereof being adjustable to equal that of the gas flow. In one embodiment of the invention, the primary aerator comprises a contoured surface positioned transversely with respect to the gas flow. Located in the surface for all or a part of its length is a series of slots with at least one slot substantially parallel to the axis of the gas flow. In another embodiment of the invention, a series of linearly spaced contoured projections extend vertically downward from the forward portion of the contoured surface of the primary aerator. In both embodiments, axial and transverse aeration of the water flow adjacent the gas flow are generated simultaneously by the primary aerator from the same axial gas flow. Axial aeration results from the turbulent intermixing of the gas and water flows as they pass the contoured surface obstruction and transverse aeration results from destruction of the gas jet formed by the gas flow during the passage thereof through the nozzle-like passages defined by the slots of the first embodiment and the spaces between the vertical projections in the second embodiment.

Additionally, the embodiment of the invention characterized by the vertical contoured projections extending from the contoured surface further comprises one or more gas injecting nozzles located in the trailing edge of each projection and supplied with gas through ducting in the primary aerator for producing additional transverse aeration.

The primary aerator of either embodiment of the invention further comprises a hydrodynamically contoured deflecting foil submerged in the water opposite the contoured surface, which complements both aeration effects of the contoured surface of the primary aerator by forming an additional turbulence producing obstruction and by forming, with the contoured surface, another nozzle-like passage. In another modification of the primary aerator, the depth thereof with respect to the air flow is made adjustable.

In accordance with a preferred embodiment thereof, the gas injection propulsion system of the present invention further comprises a secondary aerator. The secondary aerator comprises one or more gas injecting nozzles spaced transversely across the rear surface of the vessel's hull, which surface is inclined upward from the horizontal to act as a deflecting surface. The gas supply to the secondary aerator is adjustable independently of the primary aerator and the gas supply to each of the nozzles in the deflecting surface is independently adjustable. The secondary aerator further comprises one or more hydrodynamically contoured diluting foils located rearward of the primary aerator and positioned transversely across the aerated flow from the primary aerator. Each of the diluting foils includes a series of spaced gas injecting nozzles on the surface opposite the deflecting surface which are supplied with gas through ducting in the diluting foils. According to a further important feature, the angle of inclination of the diluting foils with respect to the aerated flow is made adjustable for the purpose of controlling the amount of water flow allowed to dilute the aerated flow.

In addition to the extreme simplicity of the gas injection propulsion system of the present invention and its obvious ruggedness and durability, the adaptation thereof to ship propulsion presents the following advantages:

a. The propulsive forces, which are a function of the amount of submergence of the aerators, are accompanied by a righting torque when the vessel is subjected to roll.

b. The primary aerator functions as a hydrodynamic brake when the air flow is stopped.

c. In acting against the rear portion of the ship's hull, the aerated flow that is generated by the invention reduces the coefficient of suction of the hull to a negative value, i.e., tends to eliminate the effects of depression.

d. The turning of the vessel can be effected by control of the gas supply to the secondary aerator, either independently of or in association with control of the primary aerator air supply.

e. The aerated flow may be easily deflected by back members which are located at the rear of the vessel under water, thus improving maneuverability. When the aerated flow is acting across the whole width of the hull, as in the case of surface effect vessels, the back members may be formed as extensions of the air curtain walls.

f. When the air injection propulsion system of the present invention is adapted for use on surface effect vessels, its use eliminates the need for continuous control of the depth of the air cushion under the hull. The air cushion further supplies the air flow requirements of the primary aerator. The contoured surface of the primary aerator also functions as an overflow device. Another advantage of the present invention when adapted for use on surface effect vessels is the increased stability thereby afforded. Variations in the air flow cause only one variation of thrust. In fact, the invention permits the amount of partitioning and submerged volumes, which are ordinarily required because of the instability inherent in air cushion systems, to be reduced to a minimum.

g. Although the present invention is intended particularly for surface effect vessels, it can be adapted to conventional vessels, and the interference of the gas flow with the functioning of conventional hydrodynamic propulsion devices, such as screws, which normally would occur, can be avoided by modifying the shape of the rear part of the hull of such a vessel.

Other features and advantages of the invention will be set forth in, or apparent from, the detailed description of a preferred embodiment found hereinbelow.

BRIEF DESCRIPTION OF THE DRAWINGS

In the detailed description of the preferred embodiments of the invention presented below, reference is made to the accompanying drawings in which:

FIG. 1b is a highly schematic end view of the embodiment of FIG. 1a;

FIG. 3a is a perspective view of one embodiment of the aerating baffle of the present invention;

FIG. 3b is a perspective view of another embodiment of the aerating baffle of the present invention;

FIG. 6a is a detail, in side elevation, of the schematic of FIG. 1, illustrating the operation of the secondary aerator;

FIG. 6b is a schematic detail, in plan, of the diluting foil of FIG. 6a; and

FIG. 6c is a bottom view of the aerating baffle embodiment of FIGS. 3b to 3d, illustrating the aerating effect of the air injectors located in the vertical projections of the embodiment of FIGS. 3b to 3d.

DESCRIPTION OF THE PREFERRED EMBODIMENTS

Figure 1A:
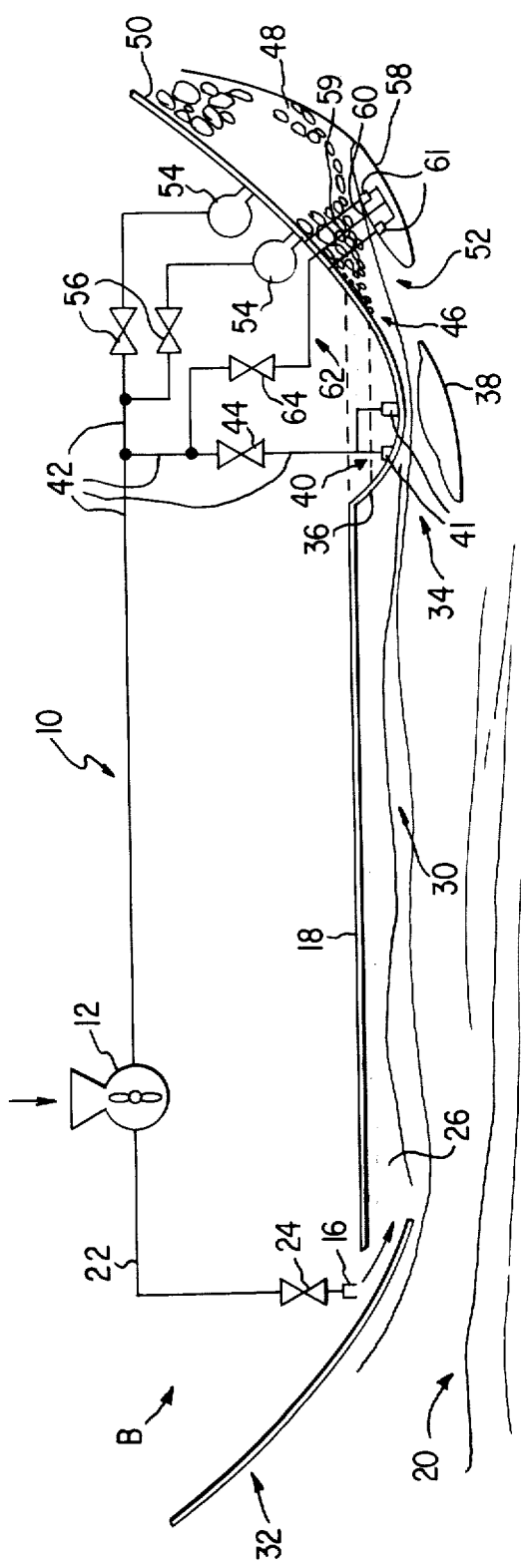
FIG. 1a is a highly schematic longitudinal sectional view of a preferred embodiment of the invention.
Figure 1B:
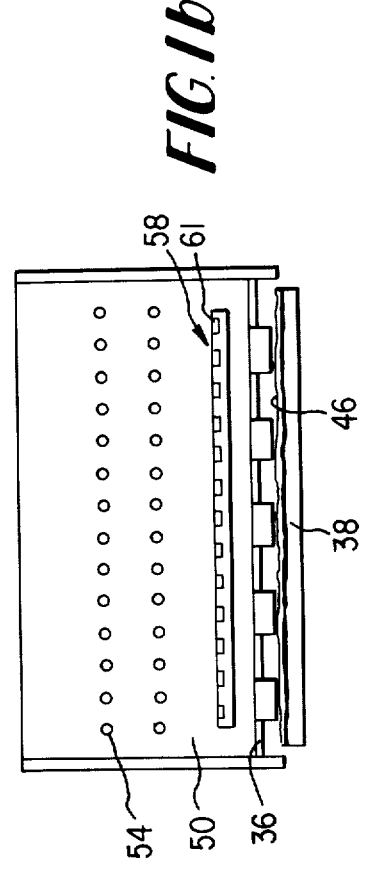
Figure 2:
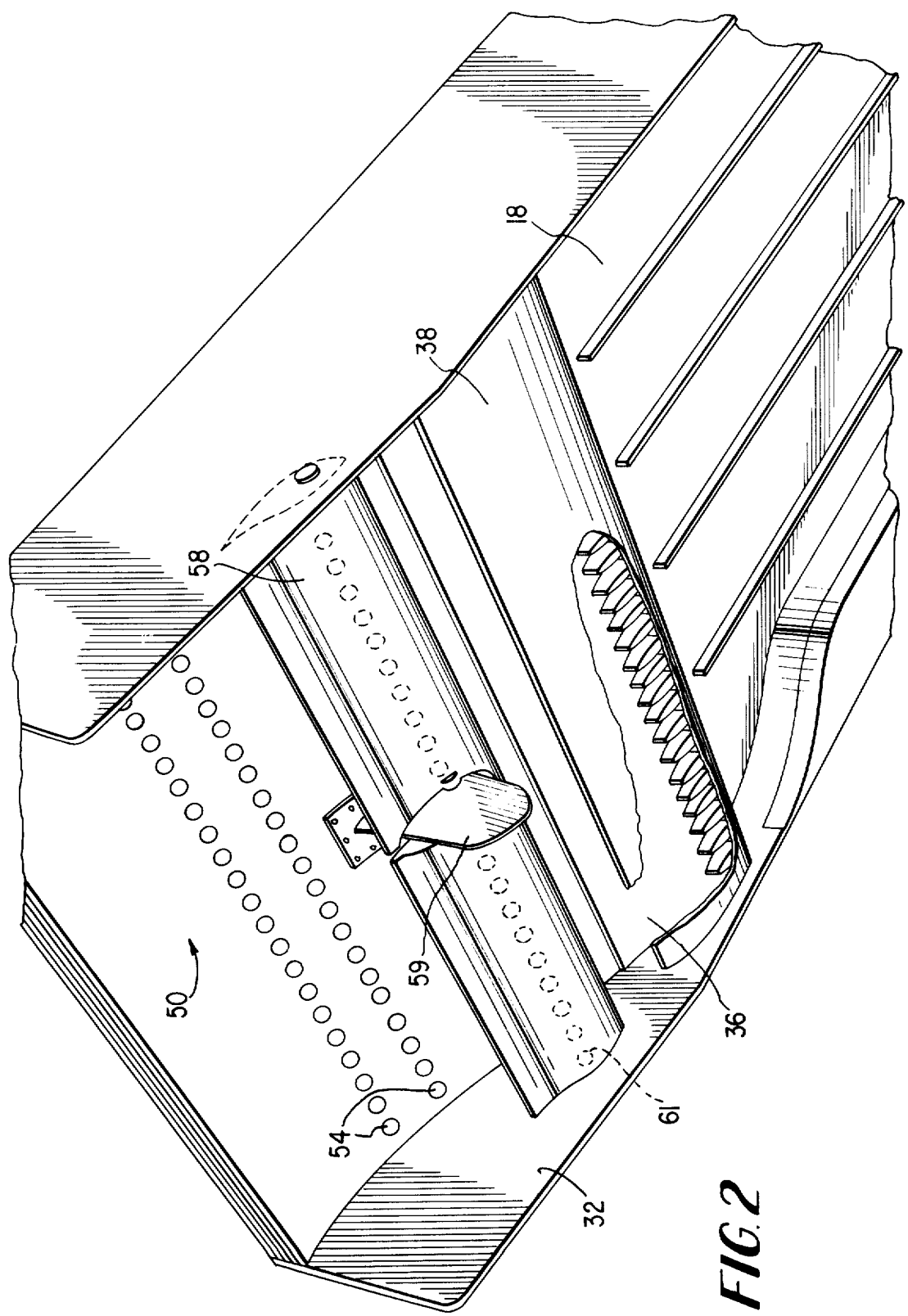
FIG. 2 is a perspective view of the aft portion of a barge bottom, partially in section and partially cut away, modified in accordance with one embodiment of the present invention.

Referring to FIGS. 1a, 1b and 2, the basic components of the gas injection propulsion system invention are illustrated and the invention will first be discussed generally with reference to these figures. A more detailed description of the components and their operation will follow in connection with some of the further figures. In FIGS. 1 and 2, the air injection propulsion system, which is generally denoted 10, includes a source of pressurized gas 12 located on a barge B. Gas source 12 may advantageously consist of any suitable, commercially available, compressor system in which air from the atmosphere is the gas being pressurized. The propulsion system 10 further comprises a primary gas injection nozzle 16 extending generally downward through the bow portion of the hull bottom 18 of barge B into the surrounding water, which is denoted 20. Nozzle 16 is provided with pressurized gas from source 12 through pipe 22, the flow of pressurized air being controlled by a valve 24. Air is injected by nozzle 16 into the water 20 to produce a distinct or homogeneous air flow 26 just beneath and axial to hull bottom 18. The air flow 26 is contained on its underside by a confluent water flow, indicated at 30, which results from movement of the hull of barge B through the surrounding water 20. When the air injection propulsion system 10 is adapted to surface effect vessels as shown in the embodiment of FIG. 2, the air flow 26 forms the air cushion on which the vessel operates and is constrained laterally by the sides of an air curtain 32, which extend into the water 20 beyond the plane of hull bottom 18. The air cushion is constained at the rear of the vessel's hull by an aerating baffle 36 to be described below.

The propulsion system 10 further comprises a primary aerator, denoted 34, which includes an aerating surface or baffle 36 projecting generally downward from the horizontal aft portion of hull bottom 18, and a hydrodynamically contoured foil 38 suspended in a spaced relationship below aerating surface 36. Positioned in the bottom face of aerating baffle 36 in a spaced relationship to be described in more detail below is a gas injection network denoted 40 and comprising injection nozzles 41, and associated ducting therefor, for injecting air into the air flow 26 and water flow 30 as they pass through aerator 34. Gas injectors 40 are fed pressurized gas from source 12 through pipes 42 and an associated control valve 44. As will be described in more detail below, primary aerator 34 serves to cause turbulences in the air flow 26 and water flow 30 which destroy the homogeneous air flow 26, thus producing an aerated flow 46 in which gas (air) bubbles 48 are suspended in a liquid flow. Note that use of the term "aerator" is not intended to indicate any limitation with respect to the type of gas utilized in the invention.

The trailing portion of aerating baffle 36 merges with the deflecting surface 50 of the secondary aerator, denoted 52. The deflecting surface 50 is generally inclined at an angle of approximately 45° from the horizontal and forms the aft most portion of hull bottom 18. Surface 50 is at least partially submerged under water. Multiple secondary gas injection nozzles 54 project perpendicularly from deflecting surface 50 in spaced relationship along axes at right angles to the main axis of the ship and are fed pressurized gas from source 12 through pipes 42 and control valves 56. Additional air is injected into aerated flow 46 by nozzles 54, the effect of which will be described in more detail below. The secondary aerator 52 also comprises at least one hydrodynamically contoured, rotatably adjustable, diluter foil 58, suspended from a strut 59 attached to deflecting surface 50, and mounted in spaced relationship relatively opposite deflecting surface 50 rearward of the primary aerator 34, such that foil 58 transversely intercepts aerated flow 46 at an adjustable angle of inclination. Diluter foil 58 includes a gas injecting network denoted 60 and comprising injecting nozzles 61 and associated ducting therefor, for the purpose of injecting additional air into the aerated flow 46 as it passes through the secondary aerator 52 between deflecting surface 50 and diluter foil 58. Pressurized gas is fed to the injector network 60 from source 12 through pipes 42 and 62 and control valve 64.

Figure 3C:
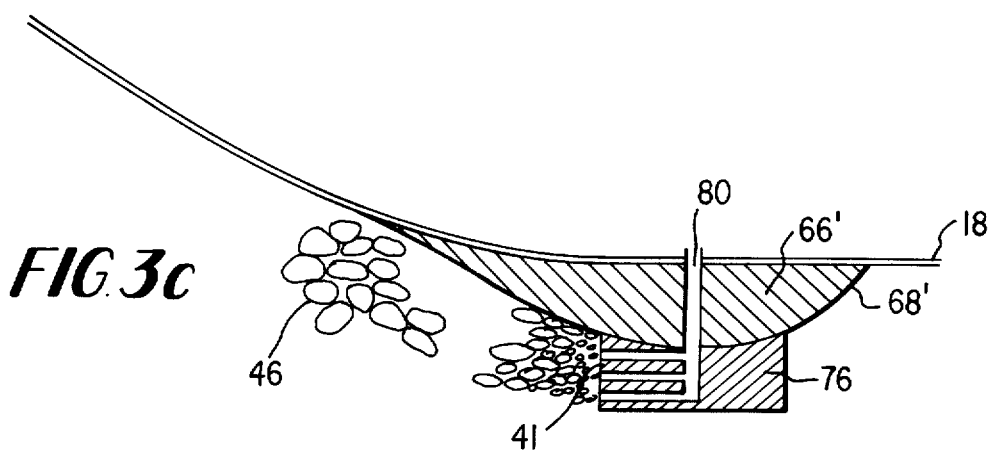
FIG. 3c is a side elevational view, partially in section, of the embodiment of FIG. 3b.
Figure 3D:
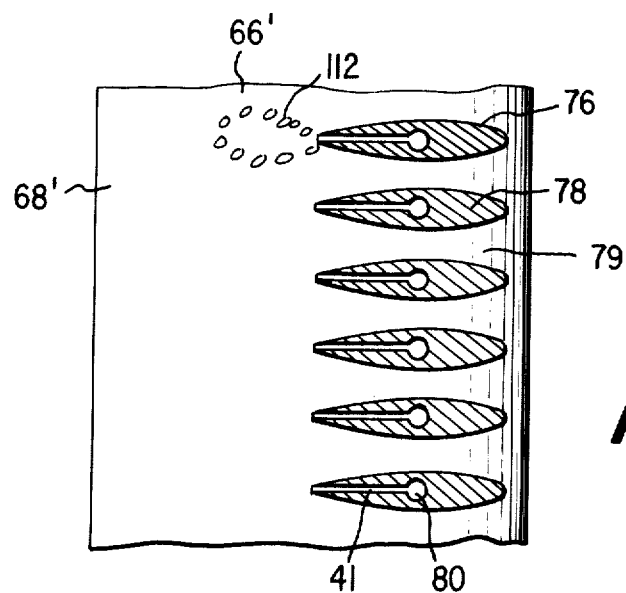
FIG. 3d is a bottom view, partially in section, of the embodiment of FIG. 3b.
Figure 4:
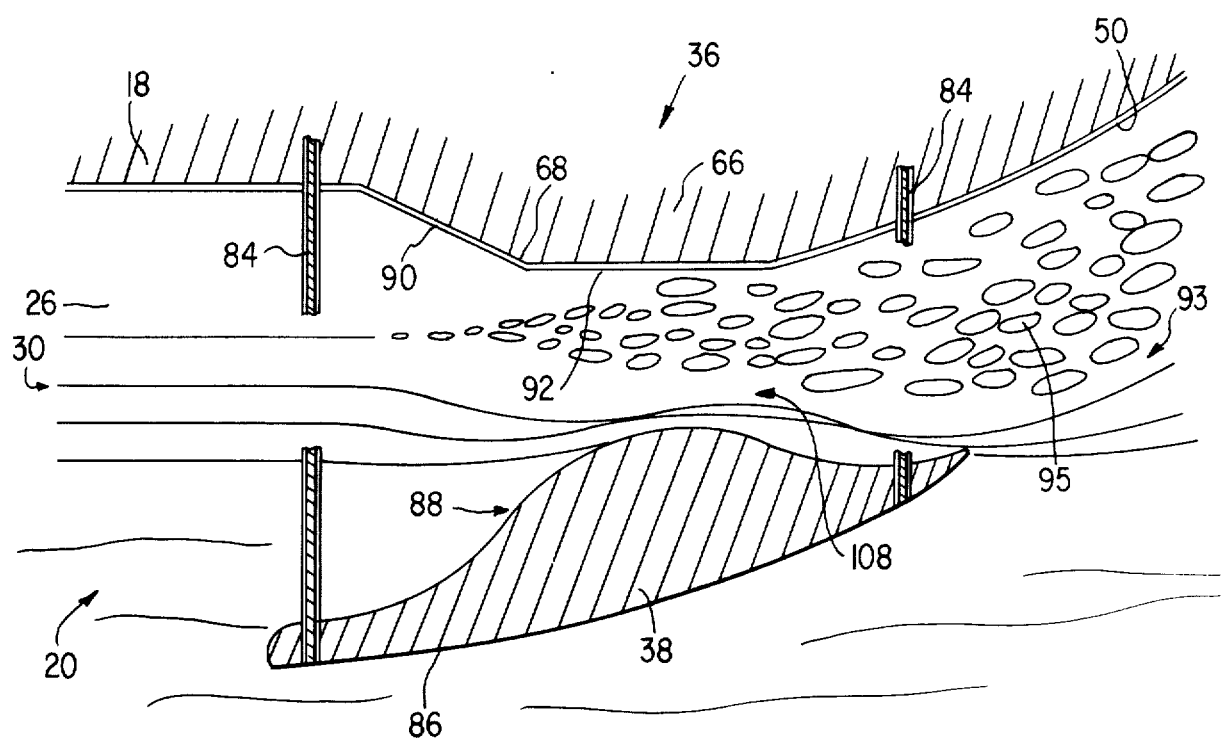
FIG. 4 is a side elevational view of the primary aerator of the present invention, illustrating the baffle embodiment of FIG. 3a, the deflecting foil and the axial aerating effect of the primary aerator on the air and water flows.

Referring to FIGS. 2, 3 and 4, the structure and operation of the primary aerator 34 will now be described in more detail. Aerating baffle 36 can advantageously take any one of several forms. Referring to FIG. 3a an embodiment is illustrated wherein aerating baffle 36 comprises a curvilinear bulge or contoured surface 66 which protrudes from hull bottom 18. Surface 66 comprises a generally cylindrical bottom face 68 in which a series of spaced slots 70 of uniform width are located, the longitudinal axes of slots 70 extending parallel to the direction of movement of flows 26 and 30. The generally horizontal flat bottom surface 72 of each slot 70 is slightly chamfered at the forward and rearward portions. The walls 74 of each slot are perpendicular to the flat bottom 72. Referring to FIGS. 3b, c and d, another embodiment of aerating baffle 36 will be described. The embodiment of FIGS. 3b to 3d is similar to that of FIG. 3a and like elements have been given the same numbers with primes attached. Contoured surface 66' comprises a generally cylindrical bottom face 68'. A series of projections 76 which have a hydrodynamic contour generally of the NACA type are transversely spaced on the forward portion of bottom face 68' with their centers lying on a single transverse axis and extending vertically downward from curvilinear surface 66' such that their longitudinal axes are parallel to direction of movement of flows 26 and 30. Projections 76 include curvilinear side walls 74' which are symmetrical about the longitudinal axis and which extend perpendicular to flat horizontal bottom face 78. Slots 79 are defined by the spaces between projections 76 and adjacent pairs of sidewalls 74' of projections 76. Extending through surface 66' and into each projection 76 is a duct network 80 which feeds gas injecting nozzles 41 located in each projection 74. Nozzles 41 are positioned within each projection 76 in a stacked, vertically spaced relationship and extend from the duct 80 horizontally rearward to the trailing edge of projection 76, where they form a series of spaced orifices in the trailing edge from which air is injected into the aerated flow 46. In another embodiment of the primary aerator, which is not illustrated, its depth with respect to the gas flow 26 is adjustable.

Referring particularly to FIGS. 2 and 4, converging foil 38 can advantageously be suspended from rigid struts 84 attached to hull bottom 18, as shown in FIG. 4 or, alternatively, foil 38 may be attached at the lateral edges to the sides of the particular hull geometry, as illustrated in the embodiment of FIG. 2. Foil 38 is suspended below and relatively opposite to baffle 36 and is oriented such that it transversely intercepts flows 26 and 30 at an inclined angle with the leading edge submerged to a greater depth than the trailing edge. Referring to FIG. 4, the hydrodynamic contour of foil 38 is adapted such that the bottom face 86 conforms to the main flow of water around the ships hull. The top or interior face 88 is generally horizontal or flat in the portion relatively opposite the leading edge portion or threshold 90 of baffle 36. Interior face 88 rises curvilinearly such that the thickest portion of foil 38 is relatively opposite the thickest portion or section 92 of the bulge or contoured surface 66 of baffle 36. Interior face 88 then gradually reverses its curvature until its trailing edge portion is relatively parallel to deflecting surface 50.

Figure 5:
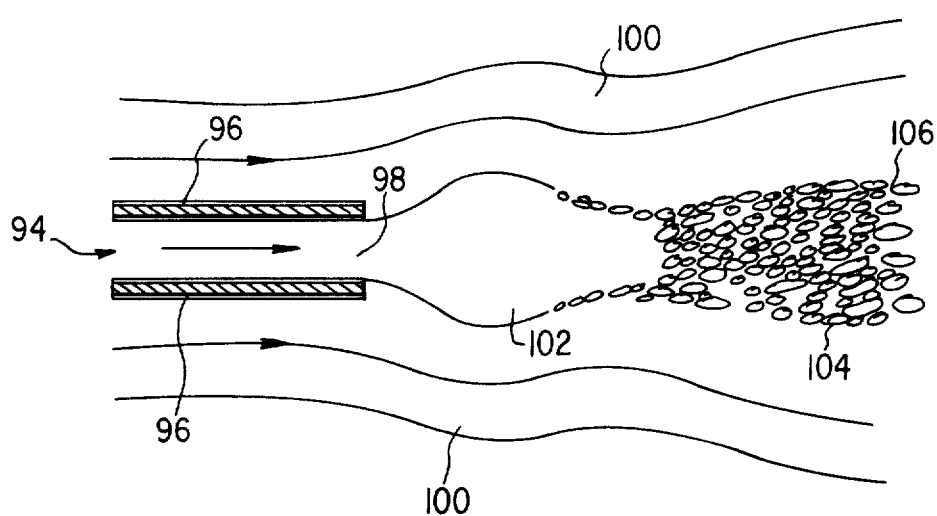
FIG. 5 is a schematic diagram illustrating the principles of transverse aeration.

Referring to FIGS. 4 and 5, the operation of primary aerator 34 will now be described. The aerating effect of primary aerator 34 is the result of two distinct forms of turbulence which are produced in the air flow 26 and water flow 30 by aerator 34. The production of each form of turbulence will first be described theoretically. Referring particularly to FIG. 4, contoured surface 66 (or 66') and deflecting foil 38 act hydrodynamically in one sense as a turbulence producing obstruction to the flows 26 and 30 which produces axial aeration. As described above, until air flow 26, representing either the air jet of pressurized gas from primary injection jet 16 or the flow of air forming the air cushion of a surface effect vessel, and water flow 30, representing the movement of the surrounding water 20 past the vessel's hull reach contoured surface 66, the two flows are separate, distinct and relatively homogeneous. The static pressure of the two flows is greater than atmospheric pressure, and the momenta of the two flows are in the same direction and at the same inclination to hull bottom 18. When the aggregate flow reaches the obstruction represented by contoured surface 66, the two distinct flows 26 and 30 then converge and the resulting turbulence causes a mixture of the two flows which produces in effect a single aerated flow 93 wherein a multitude of gas bubbles 95 are suspended in a liquid medium. As the aerated flow 93 continues downstream past contoured surface 66 it expands in size, the expansion being accompanied by an increase in the speed of flow. The converging effect of contoured surface 66 is accentuated by the hydrodynamic resistence represented by the interior face 88 of converging foil 38 to water flow 30, which increases the amount of expansion and acceleration that later occurs in aerated flow 93.

An additional aerating affect, termed transverse aeration by jet destruction, occurs in primary aerator 34. Referring to the schematic of FIG. 5, it has been found by experiment that when a gas flow 94 passes between or is injected through two spaced, relatively parallel surfaces 96, forming in effect a nozzle, denoted 98, which is directed into a surrounding water flow 100, and so long as there is turbulence in the two flows, even where slight, and regardless of the relative speeds of the two flows, the turbulence tends to spread in the gas jet 102 issuing from nozzle 98. Sufficient turbulence is thus produced in the jet 102 such that the latter becomes unstable and disintegrates into air bubbles 104, thus aerating the water flow 100. The resulting aerated flow 106 is similar to the aerated flow 93 resulting from the axial aeration described above. Further, if the initial relative speed between the two flows 94 and 100 is not negligible, the effects of viscosity increase the destructive action of the turbulence on the jet 102, and hence the aerating effect of the transverse aeration.

As described above, axial and transverse aeration both occur in aerator 34 simultaneously. Referring to FIGS. 3a, 4 and 5, in the embodiment of aerating surface 36 in FIG. 3a, the bottom face 68 of contoured surface 66 corresponds to contoured surface 66 in FIG. 4 and slots 70 in FIG. 3a correspond to nozzle 98 in FIG. 5. In the embodiment of aerating surface 36 in FIGS. 3b to 3d, the bottom face 68' of contoured surface 66' corresponds to contoured surface 66 in FIG. 4, and slots 79 in FIG. 3b and d, as well as nozzles 41, correspond to nozzle 98 in FIG. 5. Additionally, referring to FIG. 4, the passage 108 defined by the bottom face 68 of aerating baffle 36 and the interior face 88 of deflecting foil 38 corresponds to the nozzle of FIG. 5. In operation, the depth of bulge 66 or that of bulge 66' is adjusted so that either slots 70 or slots 79 intercept air flow 26 entirely and water flow 30 only slightly. It will thus be seen that both axial and transverse aeration occurs simultaneously as the air flow 26 and water flow 30 pass through aerator 34, and hence generating aerated flow 46.

Also, referring to the embodiment of FIGS. 3b to 3d and referring to FIG. 6c, the aeration processes are supplemented by additional air being injected into aerated flow 46 by nozzles 41 located in the trailing edges of projections 76. The resulting gas jets 112 accelerate by means of Venturi action the aerated flow 46 being formed in aerator 34. These jets 112 are also themselves destroyed by transverse aeration, thus adding to the aeration process by facilitating the recompression, refinement and the deflection of aerated flow 46. As aerated flow 46 passes beyond primary aerator 34, it tends to expand, picking up speed as it does so.

After passing rearwardly beyond the primary aerator 34, the aerated flow 46 passes through the secondary aerator 52 referred to above. Referring to FIG. 6, the operation of secondary aerator 52 will now be described in greater detail. As the aerated flow 46 approaches the area between diluter foil 58 and deflecting surface 50, a portion of unaerated water flow 30 is deflected by diluter foil 58 into aerated flow 46, diluting the concentration of gas bubbles 48 in flow 46 and constricting the expanded flow 46. The amount of diluting water from flow 30 which will be deflected into the flow 46 depends on the angle of inclination of foil 58 with respect to the direction of flow 30 past it. As the now diluted aerated flow 46 passes through the nozzle-like area defined by foil 58 and deflecting surface 50, transverse aeration similar to that described above occurs, again resulting in an expansion of aerated flow 46 and a corresponding increase in the speed thereof as the flow continues rearward. Air 110 injected by the nozzles 61 located in foil 58 provides additional air for the aeration and expansion process. As the expanding aerated flow 46 passes by deflecting surface 50, the reactive forces produced against deflecting surface 50 by the expanding gas provide a forward propulsion means. Air injected by the nozzles 54 located in deflecting surface 50 provide an additional aerated flow 46', the compressive turbulence effect of which serves to refine the main aerated flow 46 by reducing the size of air bubbles 48, by increasing the kinetic energy of flow 46, and by deflecting the flow. There may be additional diluter foils (not shown) mounted behind the initial foil 58, these foils being mounted in the same general manner as described above for the foil 58 and operating in a similar fashion.

Reverse movement of the vessel may be obtained by locating another injection propulsion system (not shown) similar to the one just described, but located at the forward part of the vessel, and operating in the opposite direction.

Two specific embodiments of the invention have been installed on barge models designed for surface effect operation with the following characteristics: a displacement of approximately 600 tons, a block coefficient of 0.94, a mean draught of 1.80 meters, and a beam of 7.50 meters. In the embodiment utilizing a slotted baffle corresponding to baffle 36 of FIG. 3a, the average depth of the air cushion is 0.20 meters. A contoured surface corresponding to surface 66 contains 25 equally spaced slots, the height of the contoured surface at the threshold of these slots being 0.15 meters. The depth of the contoured surface at its thickest part is 0.30 meters. There are 67 air injection nozzles, corresponding to nozzles 54, equally spaced along a transverse axis of a deflecting surface, corresponding to surface 50, which is inclined at approximately a 45° angle from the horizontal. The nozzles are submerged at a depth of approximately 0.90 meters. With this embodiment of the invention installed, the barge model can attain speeds of $V\sqrt{L}$ of about unity, were $V$ is the speed of the vessel in meters per second and $L$ is its length in meters; as well as propulsive efficiencies of approximately 40 percent, with efficiency being expressed as the ratio of theoretical power based on towage resistance to the power delivered downstream by the pressurized gas/air cushion fans.

In the embodiment utilizing an air baffle corresponding to baffle 66' with vertically projecting contoured surfaces 76 of FIG. 3b to 3d, the air cushions are maintained at an average depth of 0.30 meters. The vertically projecting contoured surfaces in this embodiment, which are not equipped with air injectors corresponding to the air injectors 41, are of the symmetrical NACA type with a maximum thickness of approximately 0.13 meters. The minimum depth of the channel between the contoured surface and a deflecting foil corresponding to deflecting foil 38 is approximately 0.15 meters, which results in a channel cross-section of 0.46 square meters. The deflecting foil has a transverse width of 1.50 meters. A diluting foil corresponding to diluting foil 58 is a contoured NACA type surface with a single curve on its upper face and a double curve on its lower face. The channel between the deflecting surface and the diluting foil 58 constitutes a nozzle-like passage with an outlet section of 3.50 square meters. Located at the thickest part of the upper surface of the diluting foil is a series of 21 air injectors (corresponding to injectors 61), each having a diameter of 2 centimeters, equally spaced along a transvese axis. The deflecting surface is inclined at approximately a 30° angle from the horizontal. The arrangement of air injection nozzles similar to nozzles 54 corresponds to that for the embodiment described above. With this embodiment of the invention installed, the barge model can attain speeds $V\sqrt{L}$ of about unity and efficiencies as defined above well in excess of 40 percent.

It will be appreciated by those skilled in the art that although the invention has been described relative to exemplary embodiments thereof, modifications and variations can be effected in these embodiments without departing from the scope and spirit of the invention.

We claim:

1. A gas injection propulsion system for marine vessels, said propulsion system utilizing the expansion of an aerated liquid flow operating against a deflecting surface, said propulsion system comprising:
  a. means for producing an axial homogeneous gas flow under the hull of said vessel, said means including a source of pressurized gas;
  b. a primary aerator located under the hull of said vessel, said aerator comprising a contoured surface aerating baffle positioned transversely to said gas flow, which extends downwardly to a depth approximately equal to the depth of said gas flow, said baffle including at least one slot spaced along all or part of the length of said baffle, said at least one slot being relatively parallel to the axis of said gas flow and having a base shaped so as to constitute a threshold which distorts the axial gas flow such that said aerator simultaneously generates axial and transverse aerating effects from the same axial gas flow.

2. The gas injection propulsion system of claim 1 wherein said propulsion system further comprises at least one secondary aerator, said secondary aerator comprising at least two gas injectors located in spaced relationship on the rear surface of said vessel perpendicular thereto, and means for adjusting a supply of pressurized gas from said source to each of said secondary aerators independently of said primary aerator.

3. The gas injection propulsion system of claim 2 wherein said supply of pressurized gas to each of said gas injectors of said secondary aerators is independently adjustable.

4. The gas injection propulsion system of claim 1 wherein said primary aerator further comprises a hydrofoil member, which has a contoured surface and which is adapted to be submerged in the water, spaced from and located relatively opposite said baffle so as to form a nozzle-like passage for the simultaneous generation of an axial and a transverse aerating effect from the axial gas flow.

5. The gas injection propulsion system of claim 1 wherein said baffle of said primary aerator comprises a solid contoured surface positioned transversely to said gas flow and a series of spaced contoured surfaces projecting vertically downward from said surface of said baffle, pairs of said vertically projecting contoured surfaces taken two at a time forming said at least one slot.

6. The gas injection propulsion system of claim 5 wherein said vertically projecting contoured surfaces located on said baffle include at least one gas injector located on the trailing edge of each said vertically projecting surface and ducting in said projecting surface for supplying gas to the corresponding injector, each said gas injector having an axis substantially parallel to the axis of said vertically projecting surface.

7. The gas injection propulsion system of claim 6 wherein said trailing edge of each said vertically projecting surface is at least partially truncated.

8. The gas injection propulsion system of claim 1 wherein said propulsion system further comprises at least one supplementary diluting foil positioned rearwardly of said primary aerator and transversely to said aerated flow, said diluting foil including a series of gas injectors on the upper surface and ducting incorporated in said diluting foil for supplying gas to said injectors.

9. The gas injection propulsion system of claim 8 wherein said diluting foil is rotatable about an axis transverse to said aerated flow.

* * * * *